United States Patent [19]

Huddle et al.

[11] Patent Number: 5,028,183
[45] Date of Patent: Jul. 2, 1991

[54] CHAIN TIE DOWNS

[75] Inventors: Thomas G. Huddle; Edward H. Niehaus, both of Charleston, Ill.

[73] Assignee: Trailmobile, Inc., Chicago, Ill.

[21] Appl. No.: 338,748

[22] Filed: Apr. 17, 1989

[51] Int. Cl.⁵ .............................................. B61D 45/00
[52] U.S. Cl. ...................................... 410/101; 410/23; 410/109
[58] Field of Search .................. 410/12, 11, 34–42, 410/96, 97, 99, 100, 103, 104, 120, 77, 81, 83, 84, 91, 94, 101, 102, 106, 107, 109, 111, 148, 10, 21, 23, 90

[56] References Cited

U.S. PATENT DOCUMENTS

| | | | |
|---|---|---|---|
| 2,998,225 | 8/1961 | Huber | 410/23 |
| 3,633,937 | 1/1972 | Hlinsky | 410/103 |
| 4,138,950 | 2/1979 | Mooney et al. | 410/108 |

Primary Examiner—Joseph F. Peters, Jr.
Assistant Examiner—Virna Lissi Mojica
Attorney, Agent, or Firm—Richard J. Myers

[57] ABSTRACT

A chain tie down anchor for a vehicle has a chain pivotally anchored to a mounting bracket and passing through a vehicle floor for access from above the vehicle floor and which when retracted hangs in a catenary like manner.

20 Claims, 2 Drawing Sheets

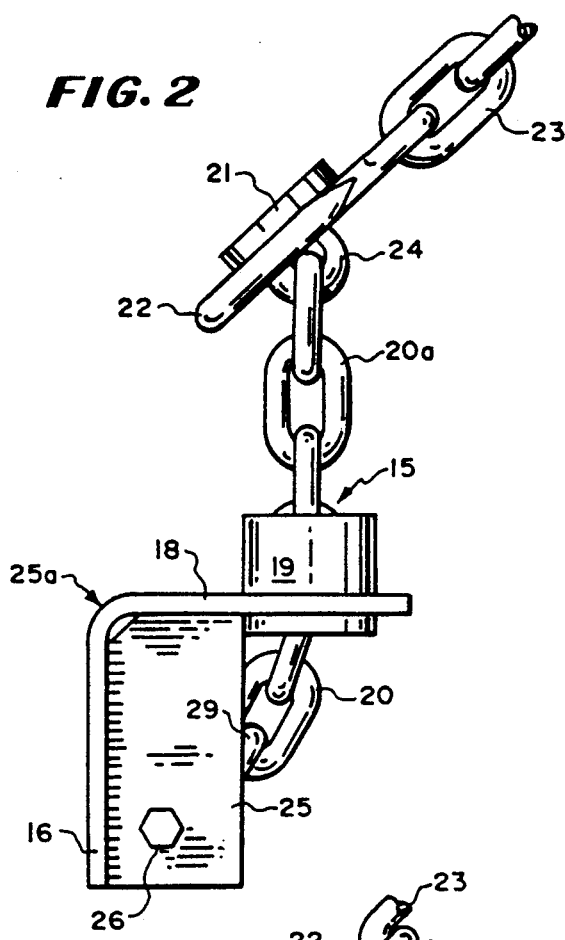
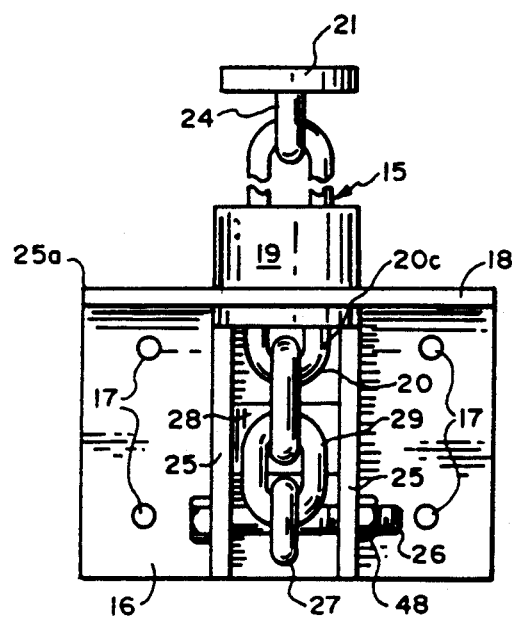
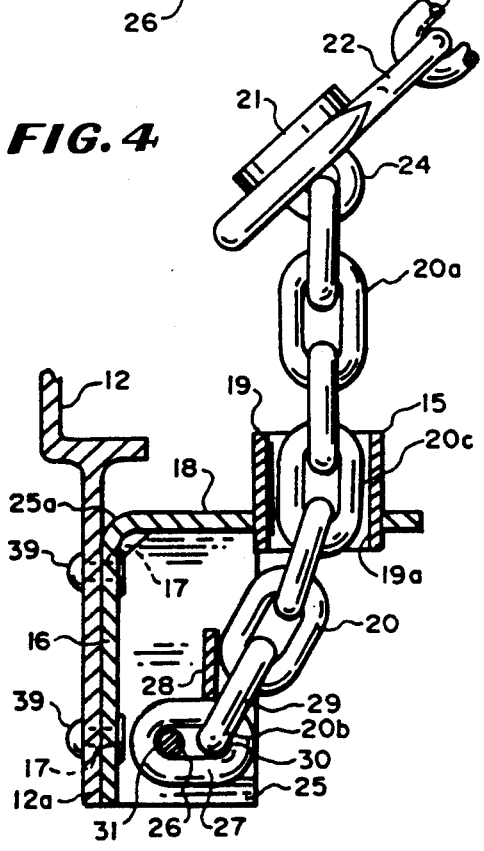
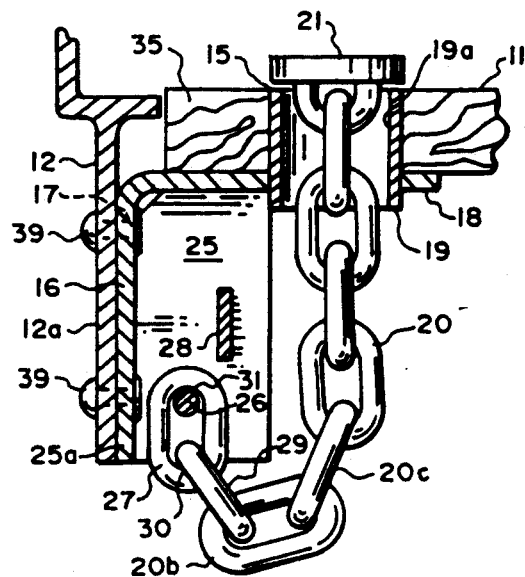

and the hook (22).

CHAIN TIE DOWNS

BACKGROUND OF THE INVENTION

1. Field of the Invention

The invention relates to cargo tie down anchoring devices for use in semi-trailers and other vehicles providing improved wear properties and substantially flush retension when not in use.

2. Description of the Prior Art

Various U.S. Patents show inventions addressing chain anchoring arrangements moveable from a substantially flushed or stored position to an extended position. None of these arrangements show the instant invention.

Wallace Number 3,865,048 shows a chain anchor with two disks on each end of the chain. The top disk permits the chain to hang below the surface or floor of a vehicle, extending downward completely enclosed within a tube. The bottom disk remains within the tube and slides upward as the chain is pulled out to a point where it stops against a reduced diameter at the top of the tube thereby providing all anchoring stress on the tube structure itself.

Fermbach Number 4,315,707 shows a vertically telescoping tube contained within a second tube which upon vertical extension provides lateral resistance to a load. A simple cotter is used to limit removal of the telescoping tube but it does not provide any substantial strength to resist a vertical load.

Kuhn Number 3,494,587 shows a tube embedded in concrete having a chain anchored at the bottom of the tube through the use of an expanding conical section anchor member. The chain retracts and is wholly contained within the tube.

Veasman Number 3,524,413 shows an extensible cylindrical anchor body having a top cap flush with the vehicle floor surface when retracted and an inverted mushroom shaped bottom section providing anchoring when a hook is attached to the anchor member.

SUMMARY OF THE INVENTION

This invention provides a number of advantages in providing a partially movable anchor in vehicles which are herein described.

One advantage of the invention is providing a substantially flush surface with a floor of a vehicle while having a chain anchor accessible from above the floor.

Another advantage of the invention is that the line of the axis of the chain passing from under the floor through and above the floor is optimized, improving loading on the chain and reducing wear.

Another advantage to the invention is that the chain when retracted is completely suspended from its two ends thereby reducing wear, increasing access for inspection and maintenance.

Other advantages of the invention will become apparent upon reading the specification.

BRIEF DESCRIPTION OF THE DRAWINGS

FIG. 2 is a side elevational view of the invention.

FIG. 3 is an end elevational view of the invention.

FIG. 4 is a sectional view taken substantially on line 4-4 of FIG. 3.

FIG. 5 is a sectional view showing the invention under tensile load, and similar to FIG. 4 showing the parts in stowed position.

DETAILED DESCRIPTION OF THE PREFERRED EMBODIMENT

Figure 1:
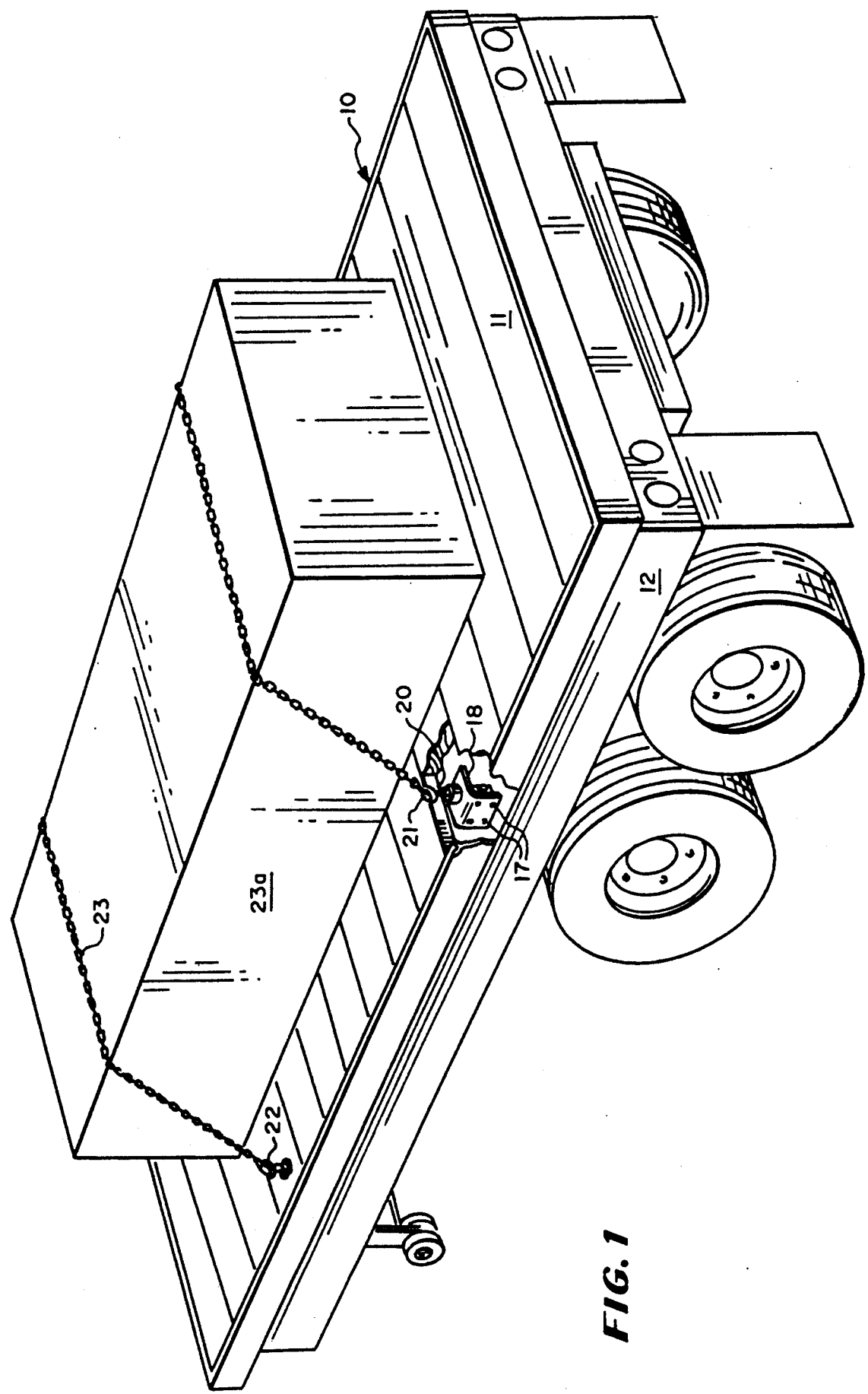
FIG. 1 is a perspective cut away view of a semi-trailer vehicle with the invention in place.

FIG. 1 shows a semi-trailer (10) having a floor (11) supported on frame members (12). The chain tie down anchor assembly (15) may be bolted or affixed to the frame member (12) in a suitable manner. The vertical leg (16) of the anchor assembly is provided with bolt holes (17) for mounting. A horizontal leg (18) meets with the vertical leg (16). A tube (19) which is welded in a corresponding opening in leg (18), provides a passageway (19a) for the anchor chain (20) which has a disk shaped stop element (21) at the top end thereof. The chain (20) may be engaged by a number of suitable devices to extend its length or provide a fixed attachment thereto such as the hook (22) and second chain (23) shown although other suitable arrangements of cable eyes, clevis arrangements or the like may be suitable.

FIG. 2 is a side elevational view of the anchor assembly (15) in which the vertical (16) and horizontal (18) legs may be seen. The tube (19) passes through the horizontal leg (18) providing a passageway for the chain (20). In this view tension on the second chain (23) wrapped about cargo 23a (FIG. 1) is transmitted through the hook (22) to the first chain (20) by the engagement of the hook (22) with the half link (24) comprising the base or lower portion of the stop (21) Also apparent in this view is one of the side plates (25) which is mounted perpendicular and welded to each of the respective legs (16 and 18) of a bracket 25a. A bolt (26) holds the bottom link of the chain (20) as will be more fully discussed herein.

FIG. 3 is an elevational edge view showing the vertical (16) and horizontal (18) legs with the two side plates (25). The mounting holes (17) are shown in plate (16), may also be seen in this view the chain (20) passing through the tube (19), which is shown broken apart for clarity, as connected with the top disk (21) via half link (24) at the top-most extension of the upper portion 20a chain. The bottom link extension (27) at the distal end of the lower portion 20b of the chain is engaged by bolt (26) in turn held in place by nut (48) or other suitable means.

FIG. 4 shows the invention in section with rivets (39) extending through bolt holes (17) in leg 16 and vertical portion 12a of frame 12 affixing a vertical leg (16) to the frame member (12). The horizontal leg (18) has the vertical tube (19) extending therethrough and through the floor providing a passageway for chain (20) to pass from beneath the floor of the trailer to above the floor of the trailer. Hook (22) is shown engaging half link (24) affixed to the disk (21).

This sectional view shows bottom link (27) pivoting on bolt (26) to a horizontal position as a lateral extension at which place the link abuts stop plate (28). As is illustrated in this view the pivoting and stop positioning aspects of this arrangement result in the horizontal displacement of second link (29) and a corresponding straightening of the axis of the chain resulting in a more direct run through the pipe (19) lessening side-ward loads on the pipe by holding the chain out of contact with the bottom end of the tube or the vertical portion thereof by effectively centering the self assuming straight length intermediate portion 20c of the chain thus minimizing wear from the rubbing of the chain (20) on the pipe or guide (19) or other parts of the assembly. The distance of this displacement is determined by the distance between the two points (30) and (31) at the ends of the bottom link (27) whereat bolt (26) engages one end of link 27 at (31). The link 29 engages link 27 at (30).

FIG. 5 shows the assembly with the chain in its retracted position the disk (21) resting on the top surface of the pipe (19). Also shown in this figure is a portion of the floor board (35) of which provides the seating surface for the semi-trailer or vehicle. This view shows the chain at rest or stowed hanging from the half link (24) at the top, and a bolt (26) at the bottom end of the chain. The lateral displacement of the bottom link (27) discussed in the previous figure no longer occurs, since the weight of the remainder of the chain causes the end link (27) to hang downwardly. The centers (30) and (31) are substantially vertically oriented thereby also resulting in displacement of the second link (29) and other links away from the center line of the pipe (19). This arrangement permits the chain to hang freely suspended from only two points in a catenary loop with minimal friction with other elements of the assembly. In the environment in which the chain tie down is used trailers are frequently removed in an unladen condition or are driven with not all chain tie down assemblies under tension. In this situation, prior art assemblies result in substantial degree of frictional contact of parts and wear to the chains and other parts of the assembly by virtue of the motion of the trailer and unwanted contact between the various parts resulting in constant clatter.

The instant invention with the chain forming a catenary like curve limits wear to only those points where the chain may be most easily inspected and the components most easily replaced. In addition the load in the engaged position is distributed on two elements of the mounting assembly, the bolt (26) and the stop plate (28).

What is claimed is:

1. A cargo hold down anchoring assembly for a vehicle having a frame with a floor supported thereon comprising:
   hollow mounting means affixed to the frame and having an anchor point;
   flexible tensionable means having an extensible and tensionable member comprising an anchored end, a free end, and a middle portion therebetween, said anchored end being attached to said mounting means;
   a passageway means through the floor permitting the extensible member to extend therethrough;
   stop means at the free end of the extensible member restricting the downward retraction thereof when untensioned;
   anchor means pivotally interconnecting the anchor point and anchored end;
   said anchor means formed and arranged to displace said extensible member toward the passageway means in a self-directed stretch out of contact with said anchor means when said member is tensioned, and said member being stowable in its untensioned condition by being suspended from said anchor means end and said stop means.

2. The invention according to claim 1, and said mounting means comprising an anchor pivot and a stop, said anchor pivot pivotally engaging the anchoring end of the extensible member and said stop limiting travel at the point nearest the point of tangency to the vertical center line of the passageway;
   and wherein said mounting means comprises, a vertical leg affixed to the frame member and a horizontal leg adjacent the floor and wherein the passageway passes through the horizontal leg.

3. The invention according to claim 2, and said extensible member comprises a link chain and said stop means comprising a plate larger than said passageway and means connecting said plate to said chain through the link means.

4. A tie down assembly for a vehicle having a horizontal floor and a supporting frame, a tube connected to the floor and extending therethrough, and having a vertical passage,
   a chain extending through said passage and having upper and
   means for positioning said lower portion of the chain from contact with said tube attendant to the chain being loaded in tension to prevent imposing lateral loads on said tube; said means for positioning further positioning said lower and upper portions and said center segment attendant to said chain being relaxed to prevent contact of said center segment with said frame, floor and tube and wear of the chains.

5. The invention according to claim 4 and said positioning means comprising;
   an extension link portion of the chain pivotally secured at one end on a horizontal axis to the frame, and means limiting upward displacement of said extension link above horizontal positions.

6. The invention according to claim 5 and said limiting means comprising;
   a stop abuttable with the top of the extension link.

7. The invention according to claim 6 and, said lower portion of the link in tension loaded condition having a portion extending at an obtuse angle to the axis of the tube.

8. An anchor assembly for cargo carried on a vehicle having a floor, and
   a vertically extending supporting frame having, a vertical portion, a guide member extending through and affixed to the floor adjacent to said vertical portion of the frame, a flexible tie member extending in a self-assumable straight length through the guide member and having a lower end portion extending below the guide member and an upper end portion extending above the guide member, and
   means securing said tie member to the frame and positioning said lower end portion of the tie member out of contact with the guide member and said tie member in axial alignment with the guide member attendant to said tie member being loaded in tension;
   said securing means further swingably displacing said lower end portion from said guide member, floor and frame.

9. The invention according to claim 8 and;
   said securing means and guide member positioning said lower end portion in a catenary shaped loop below the floor attendant to said tie member being unloaded.

10. The invention according to claim 8 and;
   said tie member comprising a link chain and said securing means comprising an end link of the chain pivotally connected to the frame and having a length extending toward the guide member to position the remaining lower end portion of the chain as it is being pulled through the guide member out of contact therewith.

11. The invention according to claim 10 and;
a bracket connected to said frame and having a stop abuttable wth the end link for limiting pivotal movement of the end link above its horizontal position.

12. The invention according to claim 8 and;
said guide comprising a vertically positioned tube and said chain having an intermediate portion substantially centered within the tube.

13. The invention according to claim 8 and;
said securing means comprising a bracket connected to the frame comprising a pair of side plates flanking said securing means, and
a stop between said side plates connected thereto and positioned above said lower end portion and in contact with a portion thereof in the loaded condition of said tie member.

14. The invention according to claim 8 and;
said tie member comprising a chain and said securing means being offset laterally from said guide member.

15. The invention according to claim 14 and;
said chain having an end link and said securing means comprising a bracket having vertical side plates flanking said end link and;
means pivotally connecting the end link with said side plates for pivotal movement about a generally horizontal axis.

16. The invention according to claim 15 and;
stop means connected to said bracket between said plates and limiting upward pivotal movement of the end link to a position holding the adjacent portion of the chain extending between the end link and said guide means in a position out of contact with said guide means and holding a portion of the chain contiguous to said adjacent portion out of contact with the guide means attendant to application of a tension load on the chain.

17. The invention according to claim 16 and
said chain having a distal end and a stop on said distal end engageable with said guide member for holding the chain in assembly therewith upon release of the chain.

18. The invention according to claim 8 and,
said tie member comprising a chain and said guide member being a tube passing the chain therethrough.

19. The invention according to claim 4 and
said means for positioning means said lower portion comprising,
a stop above the lower end portion of the chain abuttable therewith to limit upward movement thereof.

20. The invention according to claim 4 and;
said positioning means operative to position a portion of said chain below the lower end of the tube when the chain is tensed.

* * * * *